(12) United States Patent
Shishido

(10) Patent No.: US 7,184,974 B2
(45) Date of Patent: Feb. 27, 2007

(54) ONLINE USED CAR INFORMATION SEARCH METHOD, PROGRAM, AND DEVICE

(75) Inventor: Hironobu Shishido, Fukushima (JP)

(73) Assignee: Broadleaf Co., Ltd., Tokyo (JP)

( * ) Notice: Subject to any disclaimer, the term of this patent is extended or adjusted under 35 U.S.C. 154(b) by 102 days.

(21) Appl. No.: 10/360,288

(22) Filed: Feb. 7, 2003

(65) Prior Publication Data

US 2003/0171999 A1    Sep. 11, 2003

Related U.S. Application Data

(63) Continuation of application No. PCT/JP01/06140, filed on Jul. 16, 2001.

(30) Foreign Application Priority Data

Aug. 8, 2000  (JP) .............................. 2000-240066

(51) Int. Cl.
*G06Q 30/00* (2006.01)
(52) U.S. Cl. ...................................................... 705/26
(58) Field of Classification Search ................. 705/26, 705/27; 707/1–5, 10
See application file for complete search history.

(56) References Cited

U.S. PATENT DOCUMENTS

| | | | | |
|---|---|---|---|---|
| 5,754,850 | A * | 5/1998 | Janssen .................... | 707/104.1 |
| 6,041,310 | A * | 3/2000 | Green et al. ................... | 705/27 |
| 6,253,188 | B1 * | 6/2001 | Witek et al. ................... | 705/14 |
| 6,282,517 | B1 * | 8/2001 | Wolfe et al. ................... | 705/26 |
| 6,385,602 | B1 * | 5/2002 | Tso et al. ...................... | 707/3 |
| 6,633,885 | B1 * | 10/2003 | Agrawal et al. ............ | 707/102 |
| 6,772,145 | B2 * | 8/2004 | Shishido ........................ | 707/3 |
| 2001/0044758 | A1 * | 11/2001 | Talib et al. ................... | 705/27 |

FOREIGN PATENT DOCUMENTS

| | | |
|---|---|---|
| JP | 8 235160 | 9/1966 |
| JP | 62-040530 | 2/1987 |

(Continued)

OTHER PUBLICATIONS

Masako Isogawa, Practicing Useful Homepages (Websites) No. 14, Nikkei PC 21, Feb. 1, 1999, pp. 176-179, vol. 4, No. 2, Nikkei Business Publications, Inc.

(Continued)

*Primary Examiner*—Jeffrey A. Smith
*Assistant Examiner*—Amee A. Shah
(74) *Attorney, Agent, or Firm*—Alston & Bird LLP

(57) ABSTRACT

A used car information search method of inputting a search condition containing car type information for specifying a type of a used car, searching for used car data coincident with the search condition from a used car database containing the car type information and price information, and outputting the searched used car data. This method comprises a step of researching the price information in all records of used car data coincident with the car type information contained in the search condition, and creating price research information, and a step of transmitting the used car data coincident with the search condition and the price research information for displaying them to a user. This scheme enables an efficient search for the used car information regardless of how much a prospective purchaser is skilled at searching.

16 Claims, 7 Drawing Sheets

FOREIGN PATENT DOCUMENTS

| | | |
|---|---|---|
| JP | 02-201575 | 8/1990 |
| JP | 06-223117 | 8/1994 |
| JP | 07-078099 | 3/1995 |
| JP | 07-129597 | 5/1995 |
| JP | 11-025164 | 1/1999 |
| JP | 11-161659 | 6/1999 |

OTHER PUBLICATIONS

Naoko Rikitake, Supporting The Original Management, Nikkei Information Strategy, Dec. 24, 1997, pp. 180-186, vol. 6, No. 12, Nikkei Business Publications, Inc.

Notice of Reason for Rejection w/English Translation.

Tadashi Kishima, Kiyotaka Inada; Used Car Marketing Support System "Smitcats"; Sumitomo Metals; Jan. 1997; pp. 95-99; vol. 49, No. 1.

* cited by examiner

FIG. 2

20 SEARCH CONDITION INPUT SCREEN

CAR SEARCH

CAR NAME [OOOO]

[SEARCH] — 21

PRICE
NOT INQUIRED
under 500,000 YEN
under 1,000,000 YEN
under 1,500,000 YEN
under 2,000,000 YEN
under 3,000,000 YEN

YEAR MODEL
NOT INQUIRED
H11~
H10~
H09~
H08~
H07~
H06~

MILEAGE
NOT INQUIRED
under 10,000km
under 20,000km
under 30,000km
under 50,000km
under 70,000km

FIG. 4

40 SEARCH RESULT SCREEN
41 PRICE ZONE INFORMATION
42 MINIMUM PRICE  43 MAXIMUM PRICE

CARS PRICED AT 510,000 YEN TO 1,350,000 YEN ARE REGISTERED FOR CAR NAME ○○○○.

CARS COINCIDENT WITH CONDITION ARE AS FOLLOWS:

| | CAR NAME | YEAR MODEL | TYPE | MILEAGE | ... | PRICE |
|---|---|---|---|---|---|---|
| 1 | ○○○○ | H8 | AAA | 35000 | | 95 |
| 2 | ○○○○ | H8 | AAA-XX | 28000 | | 85 |
| 3 | ○○○○ | H7 | AAA-YY | 41000 | | 80 |
| ... | | | | | | |

44 USED CAR DATA

ONLINE USED CAR INFORMATION SEARCH METHOD, PROGRAM, AND DEVICE

CROSS-REFERENCE TO RELATED APPLICATIONS

This application is a continuation of International Patent Application No. PCT/JP01/06140 filed Jul. 16, 2001, which designated inter alia the United States.

FIELD OF THE INVENTION

The present invention relates generally to an online used car information search system, and more particularly to a method enabling a sufficient search for used car information irrespective of how much a prospective purchaser (user) is skilled at searching.

BACKGROUND OF THE INVENTION

In an online used car information search system, generally a desired used car (vehicle) is searched for by inputting a name of car type (a maker name and a car name), a price, a model year and a mileage as search conditions.

In a case where a person wishing to purchase a used car searches for used car information, the price is an element essential to the search. A market price (including a ratio to a price of a new car) largely differs depending on the car type.

Further, a market price of the specified type of car can fluctuate widely depending on its popularity. Namely, an image of the car type is formed by a new model after the existing model has fully changed, and hence, if the new model fails to gain a good reputation, the former model has a tendency of likewise decreasing in popularity.

If the prospective purchaser tries to search for the used car information by utilizing the online used car information search system in order to purchase a used car, this person does not recognize which level the market price thereof is set at, and is therefore unable to search for it efficiently. This problem becomes more acute for prospective purchasers who are unaccustomed to using the used car information search system.

Further, high-class cars have a wide range of price zones, and hence there are many cases where a price zone inputted as a search condition is not necessarily the absolute condition. In such a case, there arises a problem in which the prospective purchaser fails to identify a used car that would be of interest to this person because of a deviation from the inputted price zone.

A search for a general commercial article such as an electric product or item of clothing involves a thought process such as "this is a desired article, how much is this article?" and so on. In contrast, a search for a used car involves a different thought process wherein the prospective purchaser desires to examine a used car (car type) priced at a particular price level to determine whether the person wants to purchase it.

Accordingly, there may be taken a scheme of adopting a commercial article search system disclosed in Japanese Patent Application Laid-Open Publication No. 10-149392, wherein a price zone is set for every category of the articles, and a prospective purchaser is made to select the price zone concerned. In the case of the used car described above, however, the market prices fluctuate widely, and it is not therefore effective to preset the price zones.

SUMMARY OF THE INVENTION

It is an object of the present invention to provide a method enabling an efficient search for used car information regardless of how much a prospective purchaser is skilled at searching.

It is another object of the present invention to provide a method enabling a sure search for the used car information valuable to the prospective purchaser.

To accomplish the above objects, a first used car information search method of the present invention is a method of inputting a search condition containing car type information for specifying a type of a used car, searching for used car data coincident with the search condition from a used car database containing the car type information and price information, and outputting the searched used car data, the method comprising a step of researching the price information in all records of used car data coincident with the car type information contained in the search condition, and creating price research information, and a step of transmitting the used car data coincident with the search condition and the price research information for displaying them to a user.

A second used car information search method of the present invention comprises a step of extracting all records of first used car data coincident with search condition information specifying a type of a used car, a step of extracting, as price zone information, a minimum price and a maximum price mapping to the search condition information for specifying the type of the used car on the basis of the first used car data, a step of extracting second used car data coincident with other items of search condition information designated by a user on the basis of the first used car data, and a step of transmitting the price zone information and the second used car data for displaying them to the user.

Herein, the search condition information for specifying the type of the used car can be at least one of a maker name and a car name. Further, other items of search condition information contain at least one of a price, a model year, and a mileage.

A third used car information search method of the present invention further comprises a step of creating screen display data based on the second used car data and input-indicating information for re-searching in a way that sets the price-related search condition information as a selection item, and a step of transmitting the created screen display data for displaying the same data to the user.

A fourth used car information search method of the present invention further comprises a step of judging whether an extraction count of the second used car data is equal to or larger than a predetermined value, and enabling, when the extraction count is smaller than the predetermined value, the screen display data to be created.

A fifth used car information search method of the present invention further comprises a step of obtaining a registration count per price zone on the basis of the first used car data, and a step of transmitting the registration count per price zone for displaying this registration count to the user.

A first used car information search device of the present invention is a device for inputting a search condition containing car type information for specifying a type of a used car, searching for used car data coincident with the search condition from a used car database containing the car type information and price information, and outputting the searched used car data, this device comprising price researching means for researching the price information in all records of used car data coincident with the car type information contained in the search condition, and creating price research information, and transmitting means for transmitting the used car data coincident with the search condition and the price research information for displaying them to a user.

A second used car information search device of the present invention comprises first extracting means for extracting all records of first used car data coincident with search condition information for specifying a type of a used car, second extracting means for extracting, as price zone information, a minimum price and a maximum price mapping to the search condition information for specifying the type of the used car on the basis of the first used car data, third extracting means for extracting second used car data coincident with other items of search condition information designated by a user on the basis of the first used car data, and transmitting means for transmitting the price zone information and the second used car data for displaying them to the user.

A third used car information search device of the present invention further comprises creating means for creating screen display data based on the second used car data and input-indicating information for re-searching in a way that sets the price-related search condition information as a selection item, wherein the transmitting means transmits the created screen display data for displaying the same data to the user.

A fourth used car information search device of the present invention further comprises judging means for judging whether an extraction count of the second used car data is equal to or larger than a predetermined value and enabling, when smaller than the predetermined value, the screen display data to be created.

A fifth used car information search device of the present invention further comprises calculating means for obtaining a registration count per price zone on the basis of the first used car data, wherein the transmitting means transmits the registration count per price zone for displaying this registration count to the user.

The respective processes described above according to the present invention can be provided as a program executable by a computer and can also be provided through a recording medium such as a CD-ROM, a floppy disk, etc., and further via a communication line.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2 is a diagram showing one example of a search condition input screen;

FIG. 4 is a diagram showing a first example of a search result screen;

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Architecture of Online Used Car Information Search System

Figure 1:
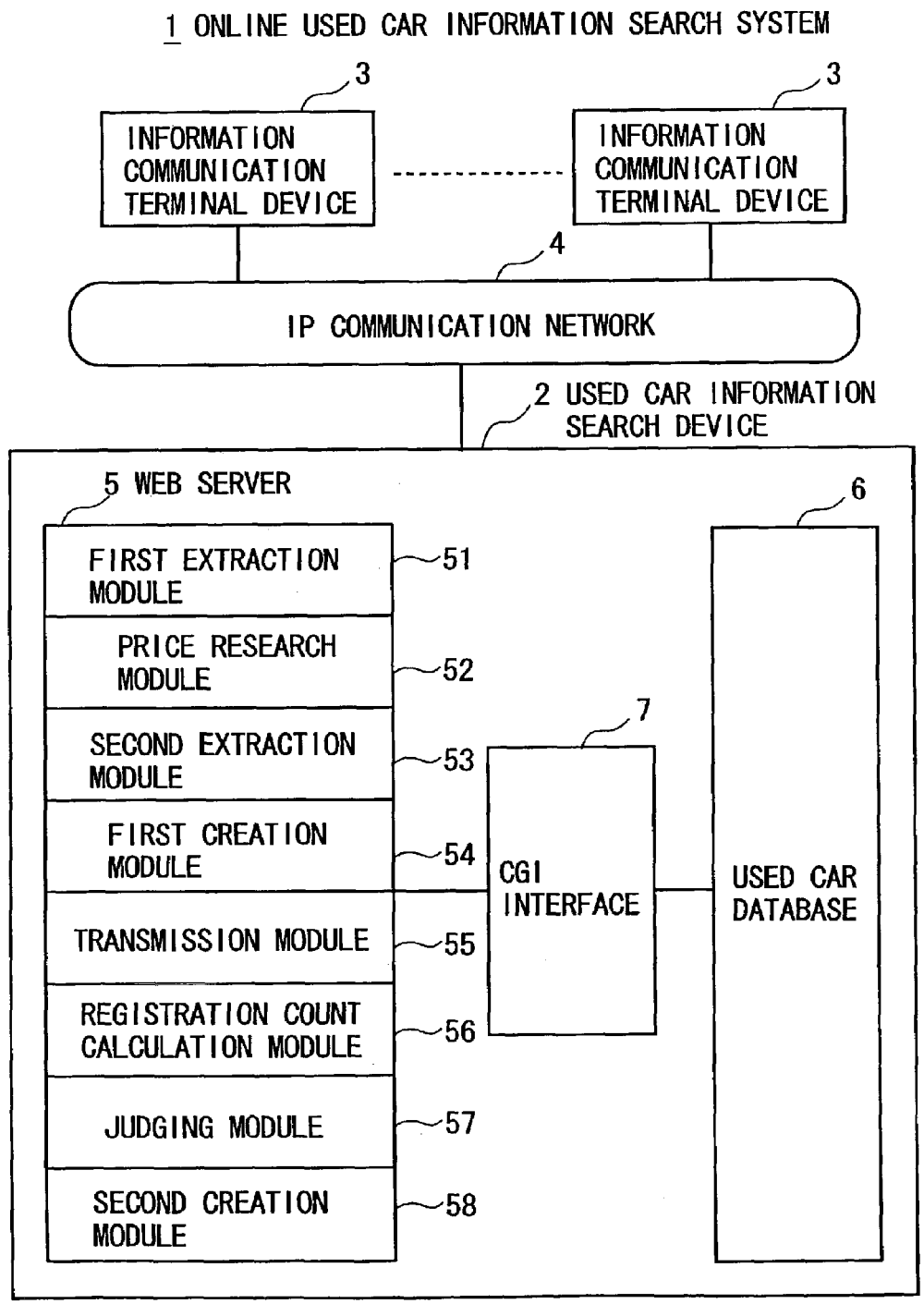
FIG. 1 is a block diagram showing an architecture of an online used car information search system in one embodiment of the present invention.

Referring to FIG. 1, an online used car information search system 1 in one embodiment of the present invention includes a used car information search device (server) 2, a plurality of information communication terminal devices (clients) 3 and an IP (Internet Protocol) communication network 4.

The used car information search device 2 is a server computer and is constructed of a WWW (World Wide Web) server which will hereinafter be referred to as a Web server 5, a used car database 6, and a CGI (Common Gateway Interface) interface module 7.

Each of the information communication terminal devices 3 can be actualized by a single unit such as a computer terminal like a personal computer implementing a WWW (Web) Browser or a mobile terminal such as a cellular phone having a content transmitting/receiving function, or by a complex thereof.

The IP communication network 4, which is the Internet in this example, enables various categories of information (data) to be transmitted and received between the information communication terminal device 3 as a client and the used car information search device 2 as a server.

This communication network 4 transmits, to each terminal device 3, content (page) data in an HTML (Hyper Text Markup Language) text format, an XML (Extensible Markup Language) text format, or an SGML (Standard Generalized Markup Language) text format, which are transmitted based on a predetermined protocol such as HTTP (Hyper Text Transfer Protocol) from the used car information search device 2.

Note that the IP communication network 4 may suffice if capable of transmitting the various categories of information in a packet mode based on the IP protocol, and any category of backbone network is available.

The used car database 6 in the used car information search device 2 is stored in a table format with data items such as a name of a car, a price, a model year, a type, a mileage, and an image of a car body.

Further, the CGI interface module 7 is a program governing an interface between the Web server 5 and the used car database 6 (which is strictly a control program of the used car database 6). This CGI interface module 7, after executing a process of searching the used car database 6, transmits the information to be sent back to the information communication terminal device 3, back to the Web server 5 in the HTML text format. Note that the description of the operation which will be explained in detail later on, omits the interposition of the CGI interface module 7.

To give a more detailed explanation, the Web server 5 of the used car information search device 2 includes, as used car information search processing functions, a first extraction module 51, a price research module 52, a second extraction module 53, a first creation module 54, a transmission module 55, a registration count calculation module 56, a judging module 57 and a second creation module 58.

In the Web server 5, the first extraction module 51 extracts all records of first used car data coincident with search condition information for specifying a type of the used car. The price research module 52 extracts, based on the first used car data, minimum and maximum prices mapping to the search condition information for specifying the type of the used car, as price zone information.

The second extraction module 53 extracts, based on the first used car data, pieces of second used car data coincident with another item of search condition information specified by the user. The first creation module 54 creates data for displaying a search result on the basis of the price zone information and the second used car data. The transmission module 55 transmits the price zone information and the second used car data for displaying them to the user.

Further, the second creation module 58 creates input screen display data for re-searching in a way that sets the price-related search condition information as a selection item. At this time, the transmission module 55 transmits the thus created input screen display data for re-searching for displaying the same data to the user.

The judging module 57 judges whether an extraction count of the second used car data is equal to or larger than a predetermined value and, if small than the predetermined value, enables the creation of the input screen display data for re-searching.

Further, the registration count calculation module 56 obtains a registration count per price zone on the basis of the first used car data. At this time, the transmission module 55 transmits the registration count per price zone for displaying it to the user.

Operation of Online Used Car Information Search System

Next, a used car information search method in the online used car information search system 1 taking the architecture described above, will be explained with reference to FIG. 1 and related drawings in combination.

First Used Car Information Search Process

FIG. 2 shows one example of a search condition input screen 20 displayed on a display screen (that is strictly a Browser window) of the information communication terminal device (which will hereinafter be simply referred to as a terminal device in some cases) 3.

A prospective purchaser (user) of a used car who utilizes the information communication terminal device 3, in the case of searching for the used car information, inputs and selects a name of the car, a price, a model year and a mileage as search conditions, and thereafter selects a "search" button 21 by a click or cursor manipulation. The search condition information is thereby transmitted via the communication network 4 to the Web server 5 of the used car information search device 2 from the terminal device 3.

Note that other items of search condition information such as a color of the car body, car accessories equipped or unequipped, etc., may be further specified as search conditions. Further, a name of the car type (a name of a maker and a name of the car) may be inputted as a piece of search condition information for specifying the type of the used car. A price may be selected and inputted as a price zone such as XXX ten thousand yen to YYY ten thousand yen.

A variety of techniques for selecting items on the terminal device 3 can be used, such as clicking a mouse or manipulating a cursor, and therefore this action is described simply as "selecting" unless a particular explanation is needed. Moreover, the description of the communication network 4 interposed when transmitting and receiving the various categories of information between the used car information search device 2 and the terminal device 3, is omitted unless a particular explanation is required.

The Web server 5 of the used car information search device 2 which has received (accepted) as a search request the search condition information transmitted from the terminal device 3, processes this search request in a next step and sends a search result back to the terminal device 3.

Figure 3:
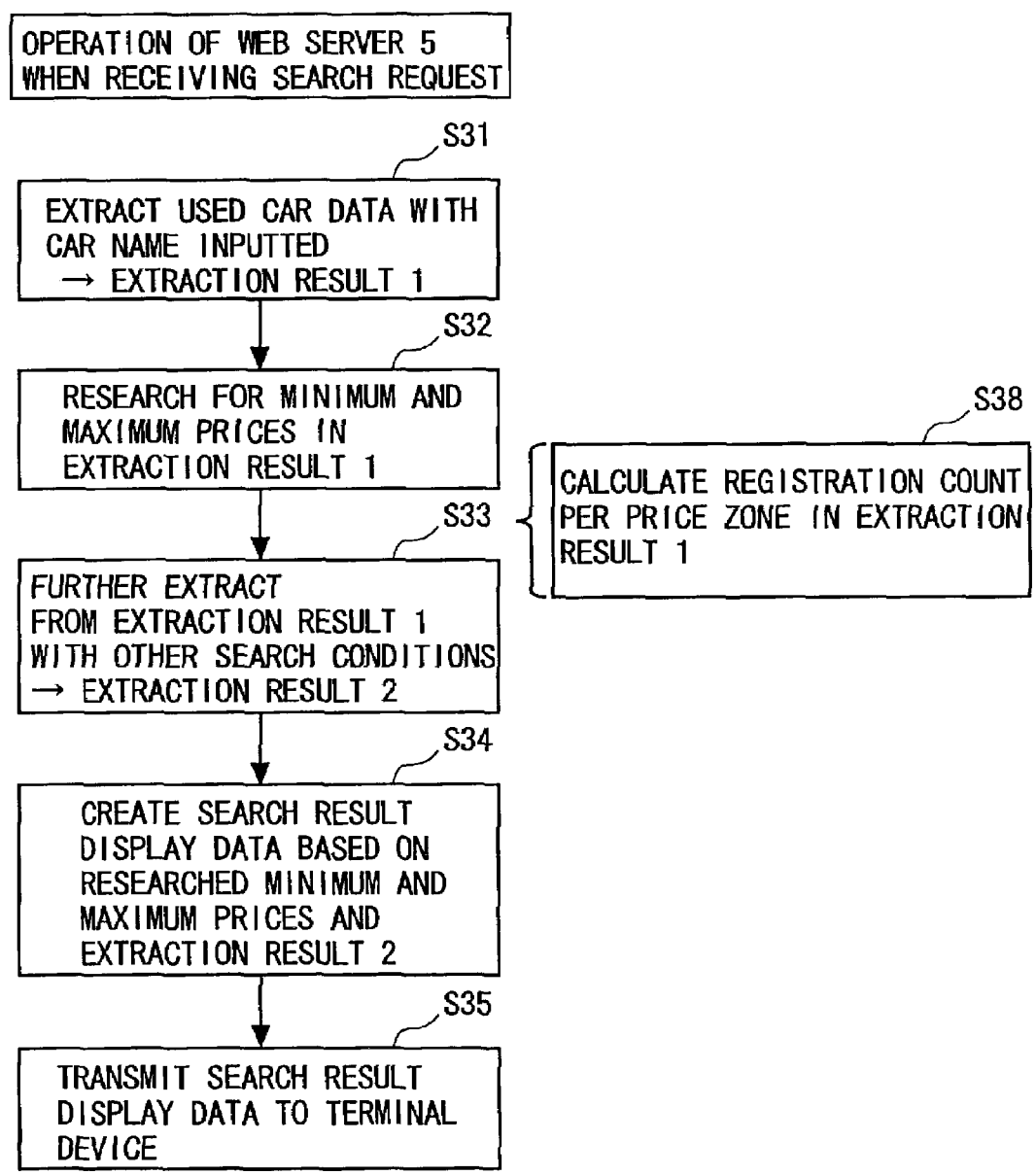
FIG. 3 is a flowchart showing steps of a used car information search process.

Namely, in the Web server 5, the first extraction module 51 searches the used car database 6 on the basis of a car name "oooo" contained in the search condition information designated by the user and extracts, as an extraction result 1, all records of used car data coincident with this car name (step S31 in FIG. 3).

The price research module 52 researches for a minimum price and a maximum prices with respect to the used car data of the extraction result 1 extracted by the first extraction module 51 (step S32). This price research is a process for extracting, as price zone information, the minimum price and the maximum price of the used car registered in the used car database 6 as those related to the car name "oooo" designated by the user. This record of price zone information is extracted irrespective of a price (e.g., under 1,000,000 yen) inputted as a search condition by the user.

Next, the second extraction module 53 extracts records of used cars coincident with the conditions from the used car data of the extraction result 1 given above on the basis of other items of search conditions contained in the search condition information, which are, to be specific, the price (under 1,000,000 yen], a model year, and a mileage (optional) (step S33).

The first creation module 54 creates search result display data on the basis of the above price zone information and an extraction result 2 extracted by the second extraction module 53 (step S34). The transmission module 55 transmits the search result display data created by the first creation module 54 to the terminal device 3 (step S35).

The search result display data received by the terminal device 3 are displayed on a search result screen 40 in a form shown in FIG. 4. On this screen 40, price zone information 41 mapping to the car name "oooo" designated by the user is displayed in addition to the data 44 of the used car coincident with the search conditions. The price zone information 41 contains a minimum price 42 and a maximum price 43. In this example, the price zone information 41 takes a form such as "cars priced at 510,000 yen to 1,350,000 yen are registered as for the car name 'oooo'."

The user is able to recognize a market price of the used car having the car name "oooo" from the price zone information 41 displayed. If the user recognizes a necessity for re-searching on the basis of a result thereof and the used car data 44, the user returns to the search condition input screen 20 and re-inputs the search conditions by selecting an unillustrated button on the search result screen 40.

Further, if the user selects one desired item from a list of the used car data 44, other detailed data items (e.g., an image of the car body) can be displayed on a different screen. Note that this process is of a general method, and hence its explanation is omitted.

Second Used Car Information Search Process

In the first used car information search process described above, the Web server 5 of the used car information search device 2, which has received the search condition information as the search request transmitted from the terminal device 3, sends the search result back to the terminal device 3 regardless of the used car data count of the extraction result 2 extracted by the second extraction module 53.

According to this process, however, the extraction count is small in some cases depending on the search condition information inputted by the user. In this case, if the user is given a chance to input a condition for re-searching, the search can be efficiently performed.

Figure 5:
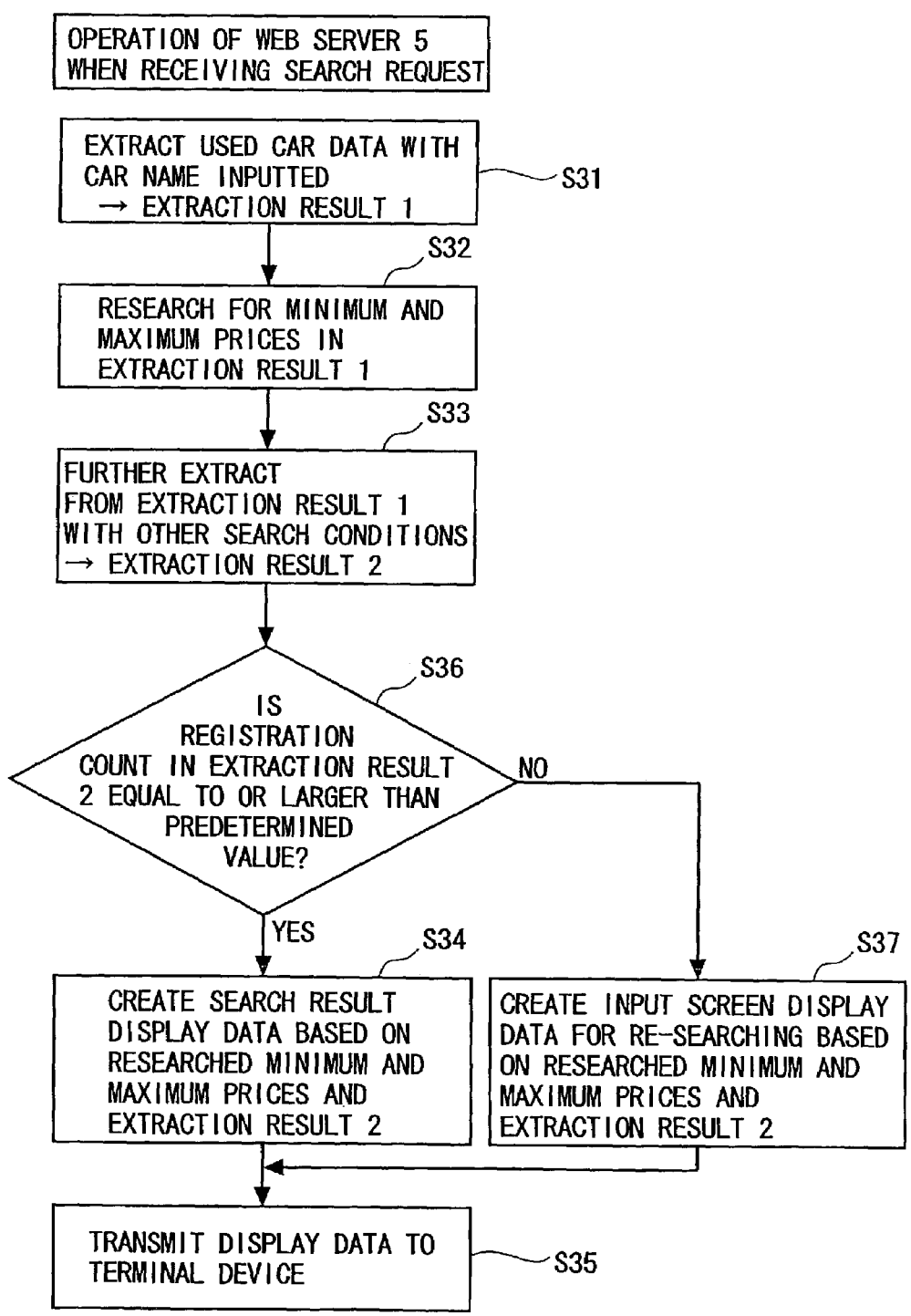
FIG. 5 is a flowchart showing steps of another used car information search process.

Accordingly, in the second used car information search process that will be described next, the judging module 57 of the Web server 5 judges whether the used car data count of the extraction result 2 extracted by the second extraction module 53 is equal to or larger than a predetermined value N (e.g., N=10) (step S36 in FIG. 5).

As a result of this judgment, if the used car data having a data count equal to or larger than the predetermined value N are extracted, as in the first used car information search process, the search result display data are created and transmitted to the terminal device 3 (steps S34, S35).

On the other hand, if used car data having a data count less than the predetermined value N are extracted, the second creation module 58 creates the input screen display data for re-searching based on the price zone information extracted in step S32 by the price research module 52 and on the extraction result 2 extracted in step S33 by the second extraction module 53 (step S37).

The transmission module 55 transmits to the terminal device 3 the input screen display data for re-searching, which is created by the second creation module 58 (S35). Note that other processes of which explanations are omitted are the same as those in the first used car information search process.

The search result display data received by the terminal device 3 are, as described above, displayed on the search result screen 40 in the form shown in FIG. 4. Further, the input screen display data for re-searching, which are received by the terminal device 3, are displayed on a search result screen 60 in a form shown in FIG. 6.

On this screen 60, hit count information 61 of the used car data coincident with the search conditions designated by the user is displayed in a form such as "three cars are coincident with the conditions", and besides the price zone information 41 mapping to the car name "oooo" is displayed.

The price zone information 41 contains the minimum price 42 and the maximum price 43. In this example, the price zone information 41 takes a form such as "cars priced at 510,000 yen to 1,350,000 yen are registered as for the car name 'oooo'." Accordingly, in the second used car information search process also, the user is able to recognize the market price of the used car named "oooo" on the basis of the price zone information 41 displayed.

If the user recognizes, based on the hit count information 61 of the used car data and the price zone information 41, a necessity for re-searching, a "re-searching under the following conditions" button 64 on this search result screen 60 is selected, thereby transmitting to the Web server a search condition selected as a search request in a re-searching condition input box 62. The same used car information search process as the above-mentioned is thus executed.

In this example, a price range of a minimum price (600,000 yen) to a maximum price (1,200,000 yen) is designated in the re-searching condition input box 62. Note that other search conditions such as the mileage, the model year, etc., may be displayed enabling these conditions to be re-inputted in this re-searching condition input box 62.

If the user selects a "display-the-result" button 63, a list of three records of used car data are displayed as a search result in a form as shown on the search result screen 40. When the "display result" button 63 is selected, a result display request is transmitted to the Web server 5 from the terminal device 3, and a response thereto is displayed on the screen 40.

Third Used Card Information Search Process

Figure 7:
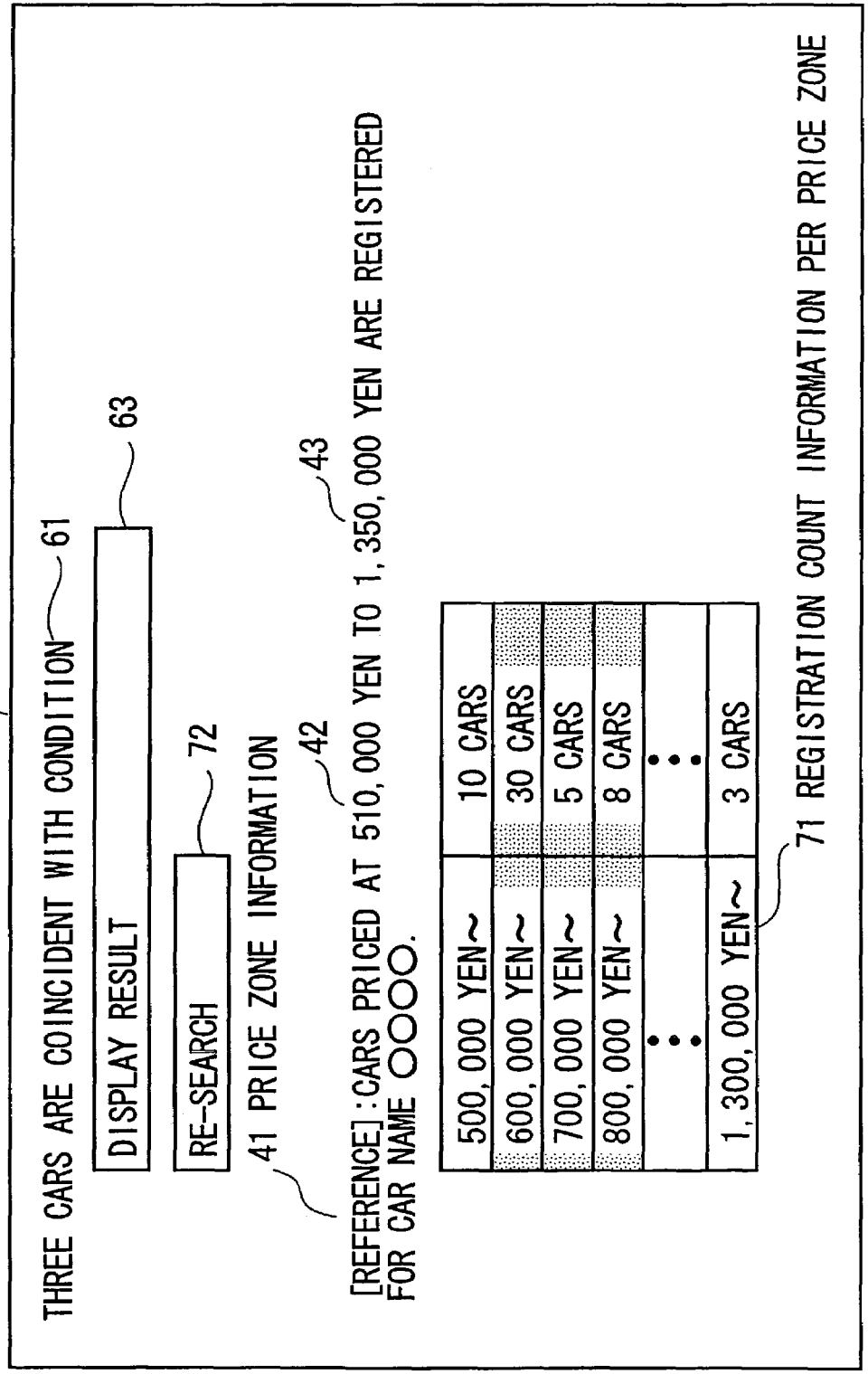
FIG. 7 shows a third example of the search result screen.

In a third used car search process that will hereinafter be described, in the Web server 5 of the used car information search device 2 which has received as a search request the search condition information transmitted from the terminal device 3, after the price research module 52 has extracted the price zone information 41 by the price research module 52, the registration count calculation module 56 calculates a registration count per price zone, and the calculated registration counts are displayed as pieces of registration count information 71 per price zone on a search result screen 70 of the terminal device 3 as shown in FIG. 7.

Herein, processing steps such as calculating a registration count per price zone will be explained as an extension of the first used car information search process already described in connection with FIG. 3, and can be also similarly carried out as an extension of the second used car information search process already described in connection with FIG. 5.

The Web server 5 of the used car information search device 2, which has received the search condition information as the search request transmitted from the terminal device 3, processes this search request in the following steps and sends a search result back to the terminal device 3.

Namely, in the Web server 5, the first extraction module 51 searches the used car database 6 on the basis of a car name "oooo" contained in the search condition information and extracts, as the extraction result 1, all records of used car data coincident with this car name (step S31 in FIG. 3).

The price research module 52 researches for a minimum price and a maximum price with respect to the used car data of the extraction result 1 extracted by the first extraction module 51 (S32). This price research is a process for extracting, as price zone information 41, the minimum price 42 and the maximum price 43 of the used car registered in the used car database 6 as those related to the car name "oooo" designated by the user. This record of price zone information is extracted irrespective of the price (e.g., under 1,000,000 yen) inputted as the search condition by the user.

Next, the registration count calculation module 56 calculates a registration count per price zone that is contained in the extraction result 1 given above (step S38). This calculation result is, as will be explained later, displayed as the registration count information 71 per price zone on the search result screen 70 of the terminal device 3.

The second extraction module 53 extracts used cars coincident with the conditions from the used car data of the extraction result 1 given above on the basis of other items of search conditions contained in the search condition information, which are, to be specific, the price (e.g., under 1,000,000 yen), the model year, and the mileage (optional). At this time, the second extraction module 53 simultaneously extracts the registration count of the used car records coincident with the condition (step S33).

The first creation module 54 creates the search result display data on the basis of the above price zone information 41, the registration count per price zone that is calculated by the registration count calculation module 56 and the extraction result 2 extracted by the second extraction module 53 (S34). The transmission module 55 transmits the search result display data created by the first creation module 54 to the terminal device 3 (S35).

The search result display data received by the terminal device 3 are displayed on a search result screen 70 in a form shown in FIG. 7. On this screen 70, hit count information 61 of the used car data that is coincident with the search condition designated by the user is displayed in a form such as "three cars are coincident with the condition", and additionally the price zone information 41 mapping to the car name "oooo" designated by the user is also displayed. The price zone information 41 contains the minimum price 42 and the maximum price 43. In this example, the price zone information 41 takes a form such as "cars priced at 510,000 yen to 1,350,000 yen are registered as for the car name 'oooo'."

On the search result screen 70, the registration count information 71 per price zone mapping to the car name "oooo" designated by the user is further displayed. The registration count information 71 per price zone is not restricted by a price condition designated by the user. In this display example, records of the registration count information 71 per price zone corresponding to a price condition range specified by the user are displayed in a way that classifies them by color.

Accordingly, the user is able to recognize a market price of the used car having the car name "oooo" from the displayed price zone information 41 and registration count information 71 per price zone.

Figure 6:
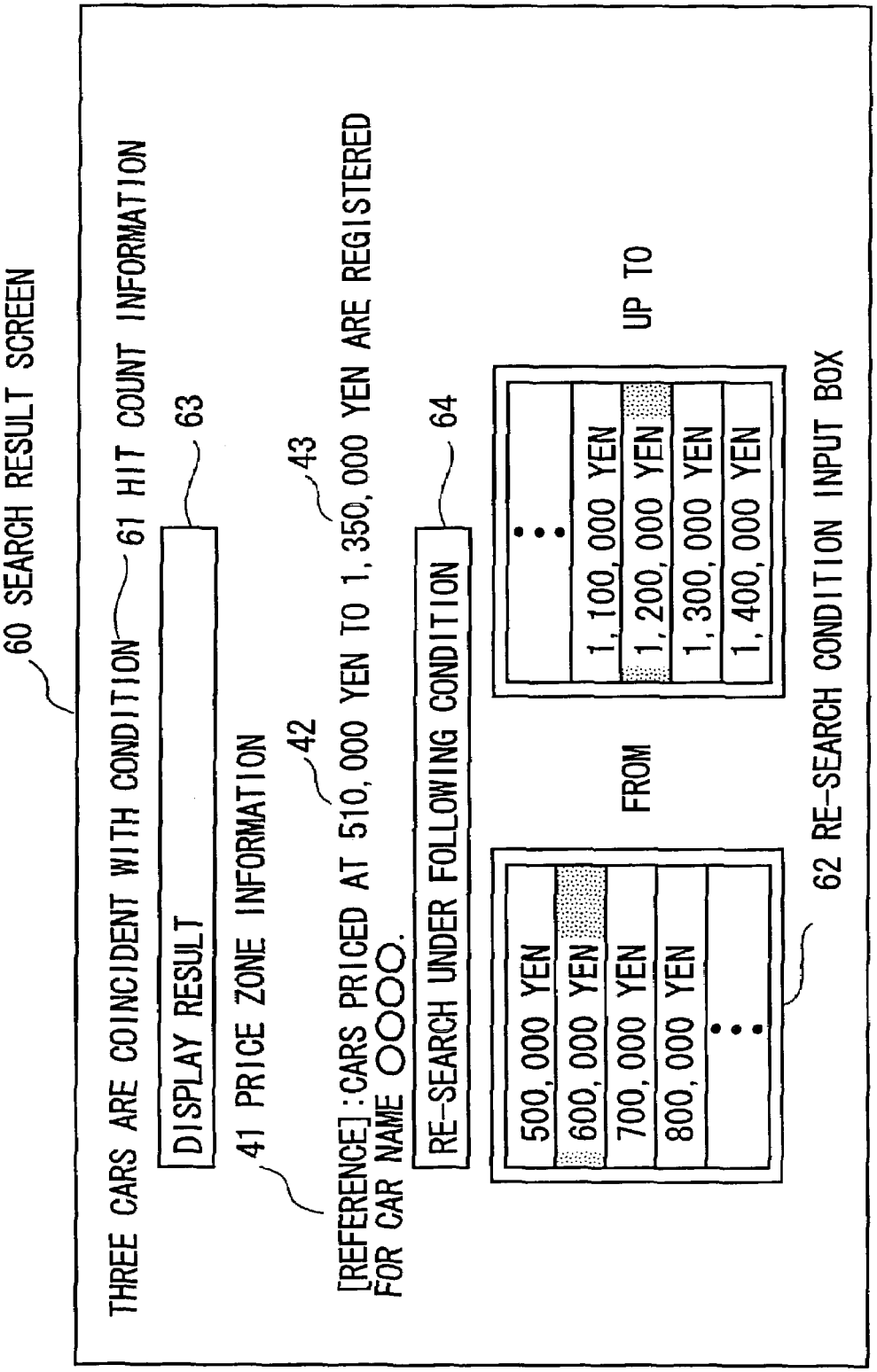
FIG. 6 shows a second example of the search result screen.

If the user recognizes a necessity for re-searching on the basis of the hit count information 61, the price zone information 41 and the registration count information 71, the user returns to the search condition input screen 20 and re-inputs the search conditions by selecting a [re-searching] button 72 on the search result screen 70. The inputted search condition is transmitted as a search request to the Web server 5, and the same used car information search process as the above-mentioned is executed. Note that the re-search condition input box 62 shown in FIG. 6 is displayed on the search result screen 70, thereby enabling the condition to be re-inputted.

If the user selects the "display result" button 63, a list of three records of the used car data are displayed as the search result on the search result screen 40 in the form shown in FIG. 4. When the "display result" button 63 is selected, a result display request is transmitted to the Web server 5 from the terminal device 3, and a response thereto is displayed on the screen 40.

MODIFIED EXAMPLE

In one embodiment discussed above, the minimum price and the maximum price are researched as the price zone information related to the target type of car each time the search is conducted. There may be, however, taken a scheme that a price information table is separately provided for every car type, an item concerned in this table is updated when registering or deleting the data, or a price research process is periodically executed, and the price zone information is thus retained in this table and may be, when searching, outputted by referring to this table. In this case, the table is stored with at least one of a maker name and a car name as car type information, a minimum price, a maximum price and a registration count per price zone in a way that maps them to each other.

Further, the respective processes in one embodiment discussed above can be also carried out by selectively combining an arbitrary plurality or all of these processes.

According to the present invention, the used car information can be efficiently searched for irrespective of how much the prospective purchaser (user) is skilled at searching.

Further, according to the present invention, it is possible to surely search for the used car information valuable to the prospective purchaser.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A used car information search method implemented on a computer, the method comprising causing a computer to perform:
   a step of extracting, from a database containing records of used cars of a plurality of different types, all records that match a type of used car specified in search condition information input by a user, said records that match said type comprising first used car data;
   a step of extracting from said first used car data, as price zone information, a minimum price and a maximum price of used cars that match the type specified in the search condition information, the price zone information being extracted irrespective of a user-input price specified in the search condition information;
   a step of extracting, from said first used car data, second used car data coincident with the user-input price and other items of search condition information designated by the user; and
   a step of transmitting the price zone information and the second used car data for displaying them to the user;
   wherein the type, the user-input price, and the other items are input by the user before starting a search.

2. A used car information search method according to claim 1, wherein the search condition information for specifying the type of the used car is at least one of a maker name and a car name.

3. A used car information search method according to claim 1, wherein said other items of search condition information contain at least one of a price, a model year, and a mileage.

4. A used car information search method according to claim 1, further comprising:
   a step of creating screen display data based on the second used car data and input-indicating information for re-searching in a way that sets the price-related search condition information as a selection item; and
   a step of transmitting the created screen display data for displaying the same data to the user.

5. A used car information search method according to claim 4, further comprising a step of judging whether an extraction count of the second used car data is equal to or larger than a predetermined value and enabling, when said extraction count is smaller than the predetermined value, the screen display data to be created.

6. A used car information search method according to claim 1, further comprising:
   a step of obtaining a registration count per price zone on the basis of the first used car data; and
   a step of transmitting the registration count per price zone for displaying the registration count to the user.

7. A used car information search program comprising a computer-readable medium containing instructions to cause a general-purpose computer to execute:
- a step of extracting, from a database containing records of used cars of a plurality of different types, all records that match a type of used car specified in search condition information input by a user, said records that match said type comprising first used car data;
- a step of extracting from said first used car data, as price zone information, a minimum price and a maximum price of used cars that match the type specified in the search condition information, the price zone information being extracted irrespective of a user-input price specified in the search condition information;
- a step of extracting, from said first used car data, second used car data coincident with the user-input price and other items of search condition information designated by the user; and
- a step of transmitting the price zone information and the second used car data for displaying them to the user;
- wherein the type, the user-input price, and the other items are input by the user before starting a search.

8. A used car information search program according to claim 7, the computer-readable medium further comprising instructions to cause a general-purpose computer to execute:
- a step of creating screen display data based on the second used car data and input indicating information for re-searching in a way that sets the price-related search condition information as a selection item; and
- a step of transmitting the created screen display data for displaying the same data to the user.

9. A used car information search program according to claim 8, the computer-readable medium further comprising instructions to cause a general-purpose computer to execute a step of judging whether an extraction count of the second used car data is equal to or larger than a predetermined value and enabling, when smaller than the predetermined value, the screen display data to be created.

10. A used car information search program according to claim 7, the computer-readable medium further comprising instructions to cause a general-purpose computer to execute:
- a step of obtaining a registration count per price zone on the basis of the first used car data; and
- a step of transmitting the registration count per price zone for displaying the registration count to the user.

11. A used car information search device comprising:
- first extracting means for extracting, from a database containing records of used cars of a plurality of different types, all records that match a type of used car specified in search condition information input by a user, said records that match said type comprising first used car data;
- second extracting means for extracting from said first used car data, as price zone information, a minimum price and a maximum price of used cars that match the type specified in the search condition information, the price zone information being extracted irrespective of a user-input price specified in the search condition information;
- third extracting means for extracting, from said first used car data, second used car data coincident with the user-input price and other items of search condition information designated by the user; and
- transmitting means for transmitting the price zone information and the second used car data for displaying them to the user;
- wherein the type, the user-input price, and the other items are input by the user before starting a search.

12. A used car information search device according to claim 11, wherein the search condition information for specifying the type of the used car is at least one of a maker name and a car name.

13. A used car information search device according to claim 11, wherein other items of search condition information contain at least one of a price, a model year and a mileage.

14. A used car information search device according to claim 11, further comprising:
- creating means for creating screen display data based on the second used car data and input indicating information for re-searching in a way that sets the price-related search condition information as a selection item,
- wherein said transmitting means transmits the created screen display data for displaying the same data to the user.

15. A used car information search device according to claim 14, further comprising judging means for judging whether an extraction count of the second used car data is equal to or larger than a predetermined value and enabling, when smaller than the predetermined value, the screen display data to be created.

16. A used car information search device according to claim 11, further comprising calculating means for obtaining a registration count per price zone on the basis of the first used car data,
- wherein said transmitting means transmits the registration count per price zone for displaying this registration count to the user.

* * * * *